United States Patent [19]

Hayakawa

[11] Patent Number: 5,021,938
[45] Date of Patent: Jun. 4, 1991

[54] TRANSMISSION SYSTEM WITH BACKUP FUNCTION

[75] Inventor: Masahiro Hayakawa, Kawasaki, Japan

[73] Assignee: Fujitsu Limited, Kawasaki, Japan

[21] Appl. No.: 321,202

[22] Filed: Mar. 9, 1989

[30] Foreign Application Priority Data

Mar. 15, 1988 [JP] Japan .............................. 63-061487

[51] Int. Cl.⁵ ............................................. G06F 11/20
[52] U.S. Cl. .................................... 364/132; 364/187; 371/9.1
[58] Field of Search ............... 364/200, 131, 132, 187, 364/184; 371/8.2, 9.1, 7; 340/825.05, 825.08

[56] References Cited

U.S. PATENT DOCUMENTS

| | | | |
|---|---|---|---|
| 4,141,066 | 2/1979 | Keiles | 364/187 |
| 4,351,023 | 9/1982 | Richer | 364/187 |
| 4,358,823 | 11/1982 | McDonald et al. | 364/200 |
| 4,574,283 | 3/1986 | Arakawa et al. | 340/825.08 |
| 4,775,976 | 10/1988 | Yokoyama | 371/9.1 |
| 4,814,984 | 3/1989 | Thompson | 364/200 |

*Primary Examiner*—Jerry Smith
*Assistant Examiner*—Paul Gordon
*Attorney, Agent, or Firm*—Staas & Halsey

[57] ABSTRACT

A transmission system having slave stations for processing data received from the master station and generating system common data, a particular slave station is provided to backup the master station when it fails. The system common data is sent to the master station and also the particular slave station. The particular slave station not only automatically detects the failure of the master station but also executes the polling of the other slave stations in place of the master station on the basis of the system common data stored in the particular slave station.

17 Claims, 4 Drawing Sheets

TRANSMISSION SYSTEM WITH BACKUP FUNCTION

BACKGROUND OF THE INVENTION (a) Field of Invention

The present invention relates to a system which includes a master station and a plurality of slave station. The present invention is useful as a building maintenance system. The system is capable of executing application method at the slave stations in accordance with application methods at the slave stations in accordance with instructions previously transmitted from the master station. The system is also particularly designed as a backup processing system to backup the master station when it fails.

(b) Description of the Related Art

FIG. 1 is a block diagram of a building maintenance system of the prior art. In FIG. 1, 1 designates a master station and 2-1, 2-2, ..., 2-n, designate slave stations. The master station 1 and the slave stations 2-1, 2-2, ..., 2-n are mutually connected through communication line 3.

Master station 1 receives particularly important data such as the power failure/power recovery signals and fire/extinguishing signals from building common facilities 4. The slave stations 2-1, 2-2, ..., 2-n send control signals to the devices 5, such as air-conditioning facilities, lighting facilities and so forth, and receive operation information from these devices.

Particular building maintanance data 4', such as temperature and humidity of open air and seasonal mode, i.e., four-season (spring, summer, autumn and winter) information, is input to the nearest slave station (for example, 2-1). The master station 1 is connected with a display unit 6 and keyboard 7 or printer 8.

In such a system, the application programs which are processed in the master station are also processed in the slave stations for dispersion of the risk of failure of the processor (CPU) in the master station 1 and failure of the master station 1 itself. Namely, the master station 1 previously loads the schedule data to respective slave stations 2-1, 2-2, ..., 2-n to control the ON/OFF state of devices 5 at predetermined times based on the schedule data received from the master station 1. Such control is called the schedule ON/OFF control.

An operation flowchart of the operations of the slave station for the schedule ON/OFF control of the prior art is shown in FIG. 2. In case the master station 1 is operating normally, the NO route is selected in the step a1. Therefore, the slave stations 2-1, 2-2, ..., 2-n store or set the system common data sent from the master station 1 as stored data in step a2. In step a3, to execute the application function is executed based on the stored data.

However, if the master station 1 fails, the prior art described above does not distribute the system common data which is fetched only in the master station 1 to the slave stations 2-1, 2-2, ..., 2-n. Therefore, the application programs in the slave stations 2-1, 2-2, ..., 2-n continue the processings based on the data last distributed by the master station 1 (refer to the YES route of step a1 in FIG. 2), resulting in the following problems.

If a fire breaks out in the building while the master station 1 is defective, the devices 5 for air-conditioning must be stopped, as a rule, during the fire. However, this cannot be achieved since the fire information is not extended to the slave stations 2-1, 2-2, ..., 2-n when the master station 1 fails. It is probable that the slave stations may even start the devices 5 on the basis of the stored data last received from the master station 1.

If the master station 1 stops while temperature and humidity control for the air-conditioning are carried out in the slave stations, the master station 1 no longer collects maintanance data for air-conditioning of the external air, humidity and seasonal mode. As a result, the maintenance data for air-conditioning is no longer distributed from the master station 1, such data is generally input only from the one inlet to the system and it is therefore essential for safe and effective control of the air-conditioning system. If supply of such data stops, then the slave station can only continue the processing with the lastest data received from the master station 1. Hence, it is no longer possible to execute the control in accordance with the environmental condition. It is also undesirable from the point of view of energy, conservation.

SUMMARY OF THE INVENTION

The present invention has been proposed considering such problems of the prior art and it is therefore an object of the present invention to provide an backup processing system to backup the master station during its failure in a particular slave station in order to economically improve the redundancy of system.

FIG. 3 is a block diagram of the basic configuration of the present invention.

In FIG. 3, the slave station 2-1 (this slave station 2-1 or a backup slave station 2-1 is called a particular slave station 2-1) among the slave stations 2-1, 2-2, ..., 2-n is different from the corresponding slave station 2-1 (refer to FIG. 1) of the prior art. That is, the particular slave station 2-1 backs up the master station 1 if the master station 1 fails. Accordingly, the system common data to be sent to the master station 1 is also transmitted to the particular slave station 2-1 through the transmission line 9.

The particular slave station 2-1 automatically detects the failure of the master station 1 when it fails. The particular slave station 2-1 also polls the other slave stations 2-2, ..., 2-n in place of the master station 1, based on the system common data described above.

The system common data input to the master station 1 is the most important data for the transmission system described. The most important data described is the fire information or the power supply ON/OFF information to be supplied to the system.

The master station 1 includes a display unit 6. The master station 1 periodically executes the polling to a plurality of the slave stations, collects the operation information stored in the slave stations and displays such data on the display unit.

The master station 1 and slave stations 2-2, ..., 2-n are respectively provided with line interface units, and are connected to each other with a communication line 3 through such line interface to realize transmission and reception of data through the communication line 3.

The master station 1 comprises a display unit 6 for displaying conditions of respective slave stations, a digital signal input/output unit for receiving the system common data from the building common facilities 4, and a control unit for collecting, storing the system common data and sending such data to each slave station. The particular slave station and the other slave stations comprises a digital signal input/output unit for controlling operations of air-conditioning and lighting facilities, an analog input/output unit for inputting conditions data such as room temperature, etc. and a control unit for collecting and storing condition data of air-conditioning and lighting facilities and room temperature data, and for sending such data to the master station 1 during the polling therefrom. The particular slave station 2-1 has the following functions, in addition to the functions of the other slave stations, collecting external air temperature and humidity information from the analog receiving/output unit and input in parallel the system common data to be input to the master station 1. Instruction information depending on the seasons is also input to the digital signal input/output unit of the particular slave station 2-1.

The master station 1 periodically sends the system common data to the slave station. The slave stations store the system common data upon receiving it and control the devices 5 connected thereto based on the system common data stored. The master station 1 inserts the schedule control information for each device 5 into the system common data and sends such data. Each slave station controls the devices 5 connected thereto for ON/OFF conditions in accordance with the schedule control information.

The particular slave station 2-1 among other slave stations receives in parallel the system common data from the master station, controls the device 5 therein by receiving the system common data from the master station 1 while the master station is in the operating condition, and controls the devices 5 therein using the system common data received when the master station 1 is detected as having a defective condition and also sends the system common data, in place of the master station 1, to the other slave stations. The other slave stations other than the particular slave station 2-1 receive the system common data from the particular slave station 2-1 when the master station fails and also controls each device therein. The particular slave station is typically located nearest to the master station 1 among the slave stations.

In such a configuration, when the master station 1 is operating normallly, the application processing is executed in the slave stations 2-1, 2-2, . . . , 2-n based on the instructions previously issued from the master station 1. In this case, the system common data to be sent to the master station 1 from the building common facilitates 4 is also transmitted to the particular slave station 2-1 through the transmission line 9.

Thereafter, if the master station 1 for some reason fails, the particular slave station 2-1 automatically detects failure of the master station 1 and polls to the others slave stations 2-2, . . . , 2-n, in place of the master station 1, based on the system common data which has been received.

DESCRIPTION OF THE PREFERRED EMBODIMENT

An embodiment of the present invention will be explained with reference to the accompanying drawings.

Figure 4:
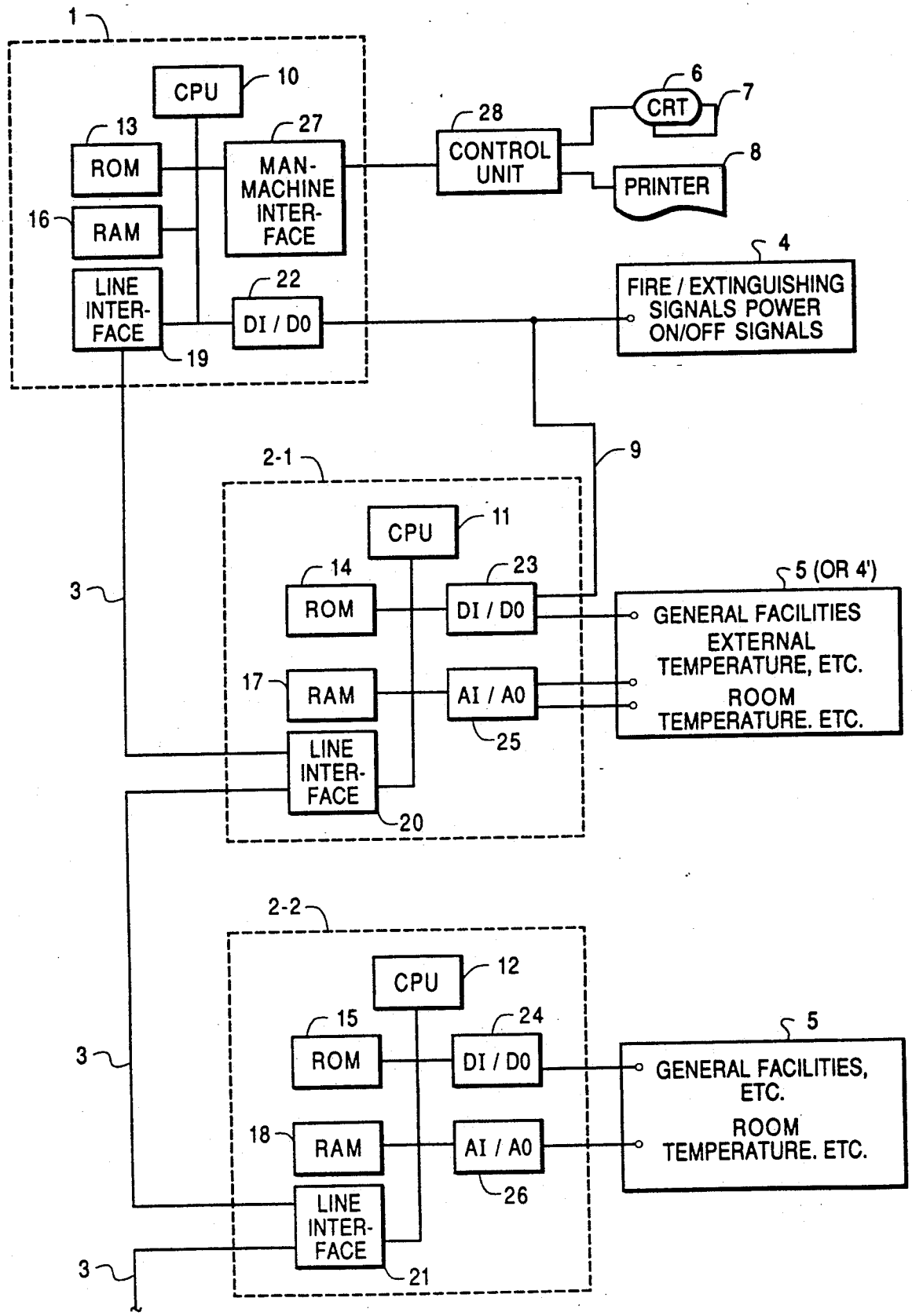
FIG. 4 is a block diagram of an embodiment of the present invention.

FIG. 4 is a block diagram of an embodiment of the present invention. In FIG. 4, the master station 1 employs the hardware configuration comprising a processor (CPU) 10, a read-only memory (ROM) 13, an random access memory (RAM) 16, a line interface 19, a digital signal input/output unit (DI/DO) 22 and a man-machine inerface 27. The backup slave station 2-1, as the particular slave station, employs a hardware configuration comprising a CPU 11, a ROM 14, a RAM 17, a line interface 20, a digital signal input/output unit (DI/DO) 23 and an analog signal input/output unit (AI/AO) 25.

The other slave station 2-2 also employs the hardware configuration comprising a CPU 12, a ROM 15, a RAM 18, a line interface 21, a digital signal input/output unit (DI/DO) 24, and an analog signal input/output unit (AI/AO) 26. Other slave stations employ the same hardware configuration as the slave station 2-2.

Moreover, the line interface 19 of master station 1 and line interfaces 20, 21 of the slave stations 2-1, 2-2, . . . , 2-n are mutually connected with the communication line 3.

The digital signal input/output units 22, 23 of the master station 1 and slave station for backup 2-1 receive the building common data (system common data) including high priority data such as power a ON/OFF signal and a fire/extinguishing signal. Moreover, the building common data (system common data) such as external temperature, humidity or season mode are input to the analog input/output unit 25 of the backup slave station 2-1 from the building common facility 4.

Since the system common data sent to the master station 1 is also sent to the slave station for backup 2-1, the backup slave station 2-1 becomes a backup for the master station 1 when it fails. Moreover, the backup slave station 2-1 is provided with the function to automatically detect failure of master station 1 and execute the polling of the other slave stations 2-2, . . . , 2-n in place of the master station 1 based on the system common data. As shown in FIG. 4, the backup slave 2-1 is typically selected as the slave station located nearest to the master station 1 from the viewpoint of wiring work.

The slave stations 2-1, 2-2, . . . , 2-n send control signals to the ordinary facilities such as the air-conditioning facilities through the digital signal input/ouput units 22, 23 or receives the operation information from these facilities. Slave stations 2-1, 2-2, . . . , 2-n also the information such as room temperature through the analog signal input/output units 25, 26. Moreover, the master station 1 is connected with the display unit 6, keyboard 7 or printer 8 through the man-machine interface 27 and man-machine control unit 28.

With the configuration described above, when the master station 1 is operating normally, the application processings are executed in the slave stations 2-1, 2-2, . . . , 2-n on the basis of the instruction transmitted previously from the master station 1. Namely, the master station 1 loads the schedule data to the slave stations 2-1, 2-2, . . . , 2-n and these slave stations control respective units for ON and OFF at the predetermined time on the basis of the schedule data received from the master station 1. In this timing, the system common data to be sent to the master station 1 is also sent to the backup slave station 2-1 through the transmission line 9.

Thereafter, if the master station 1 fails for some reason, for example, due to a fire breaking out in the building, the backup slave station 2-1 automatically detects a failure of master station 1 and makes the polling of the other slave stations 2-2, ..., 2-n in place of the master station, on the basis of the system common data which it also receives. Namely, in this case, the backup slave station 2-1 detects that the master station 1 has failed due to the building fire with the fire signal to be input through the transmission line 9 and outputs the unit OFF signal on the basis of the result of detection in preference to the schedule data previously input to the other slave stations 2-2, ..., 2-n. Thereby, if a fire breaks out in the building when the master station fails, a device 5 such as air-conditioning facilities can be stopped as determined.

In addition, even if the master station 1 fails while the temperature or humidity control of air-conditioning facility (DDC: Direct Digital Control) is carried out in the slave stations, the air-conditioning common data such as external temperature, humidity and season mode is input to the backup slave station 2-1. Therefore, the backup slave station 2-1 is capable of executing the polling to the other slave stations 2-2, ..., 2-n in place of the master station 1 on the basis of such air-conditioning common data, thus enabling energy savings.

The control by the backup slave station 2-1 is continued until recovery of the master station 1.

The backup slave station 2-1 is naturally capable of suspending the necessary units or controlling the air-conditioning facility like the other slave stations 2-2, ..., 2-n on the basis of the data thereof.

Figure 1:
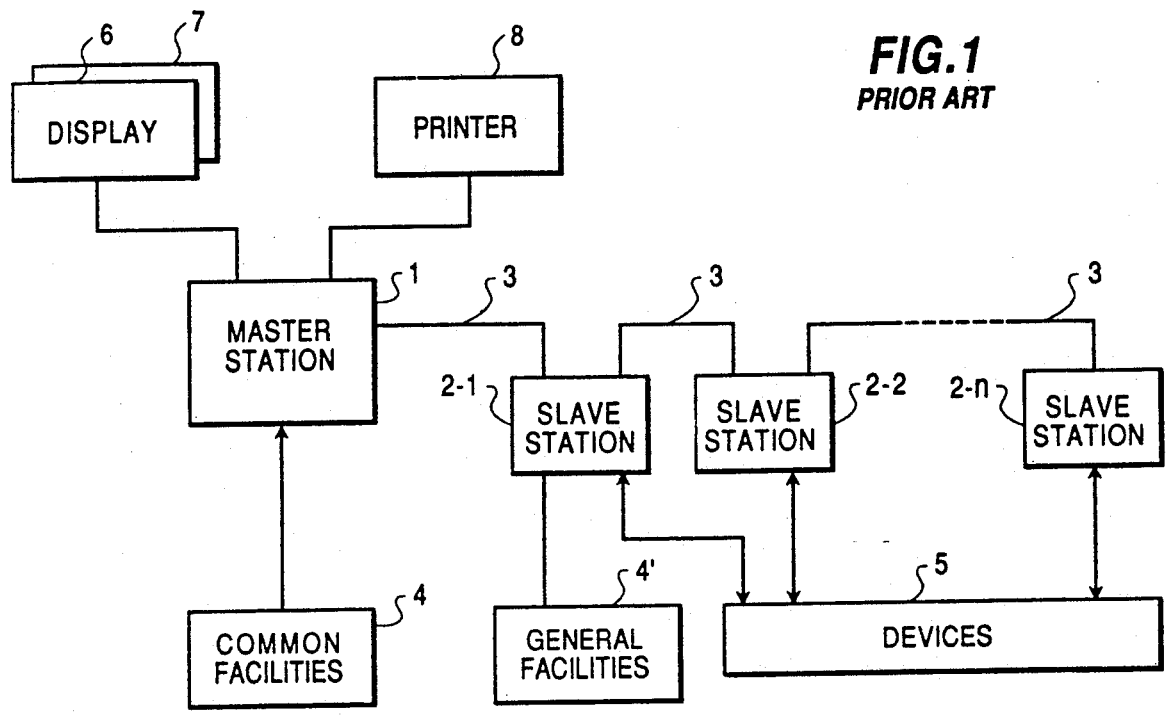
FIG. 1 is a block diagram of the system configuration of the prior art.
Figure 2:
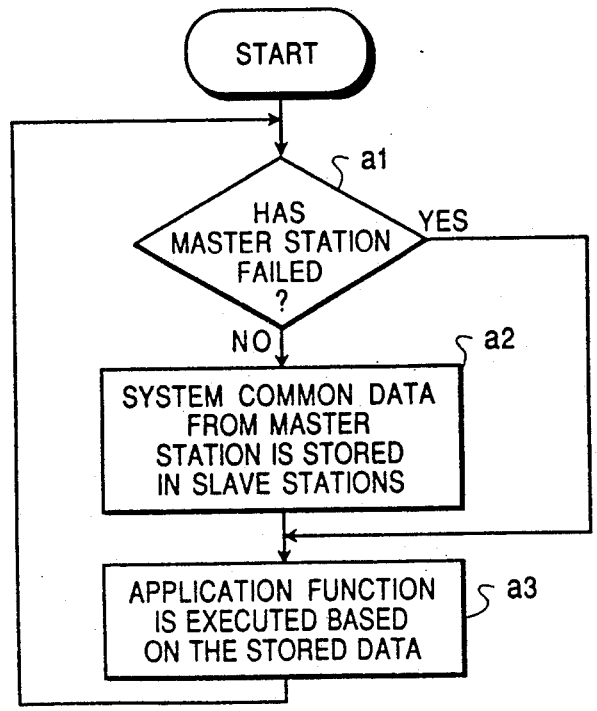
FIG. 2 is an operation flowchart for a slave station as the prior art.
Figure 3:
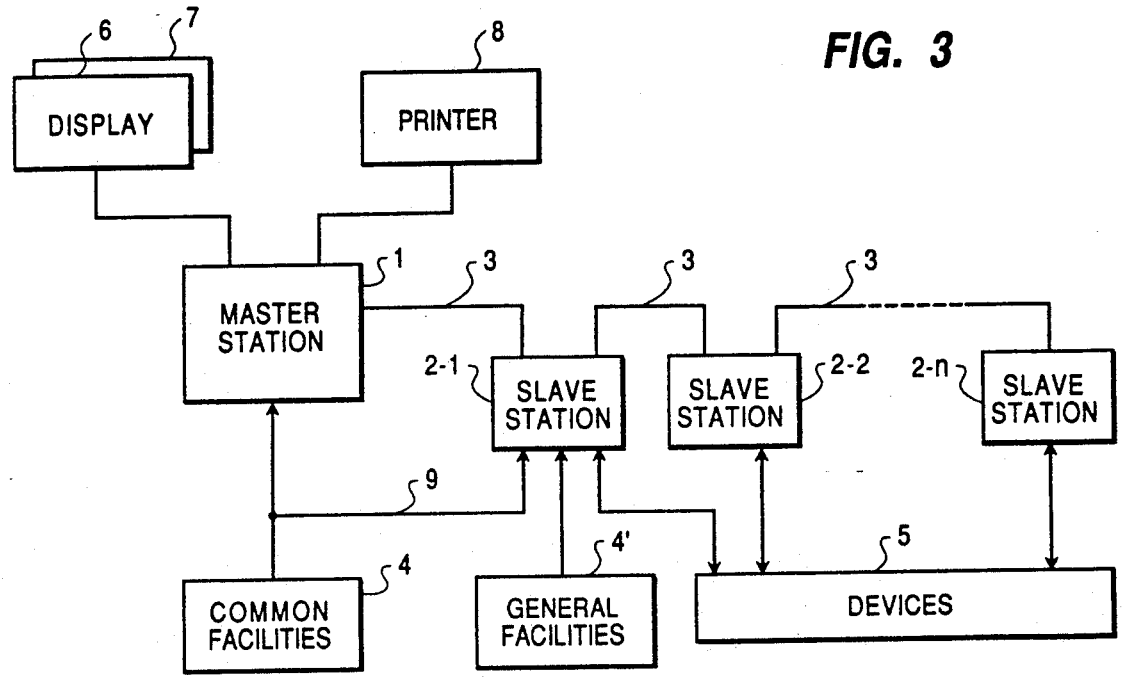
FIG. 3 is a block diagram of a basic configuration of the system of the present invention.
Figure 6:
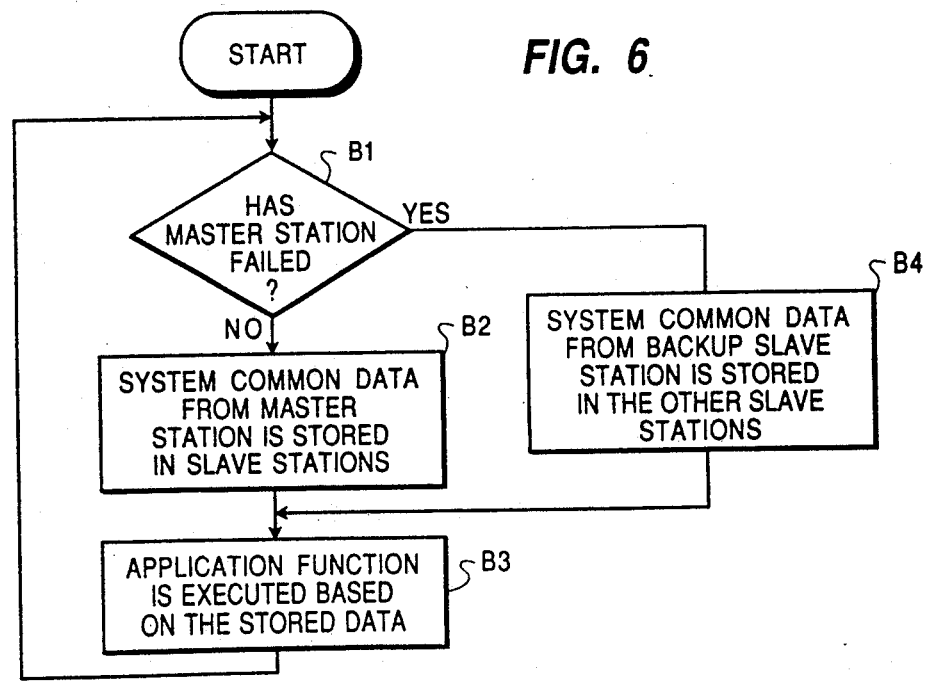
FIG. 6 is an operation flowchart of an other slave station among the slave stations in the present invention.
Figure 5:
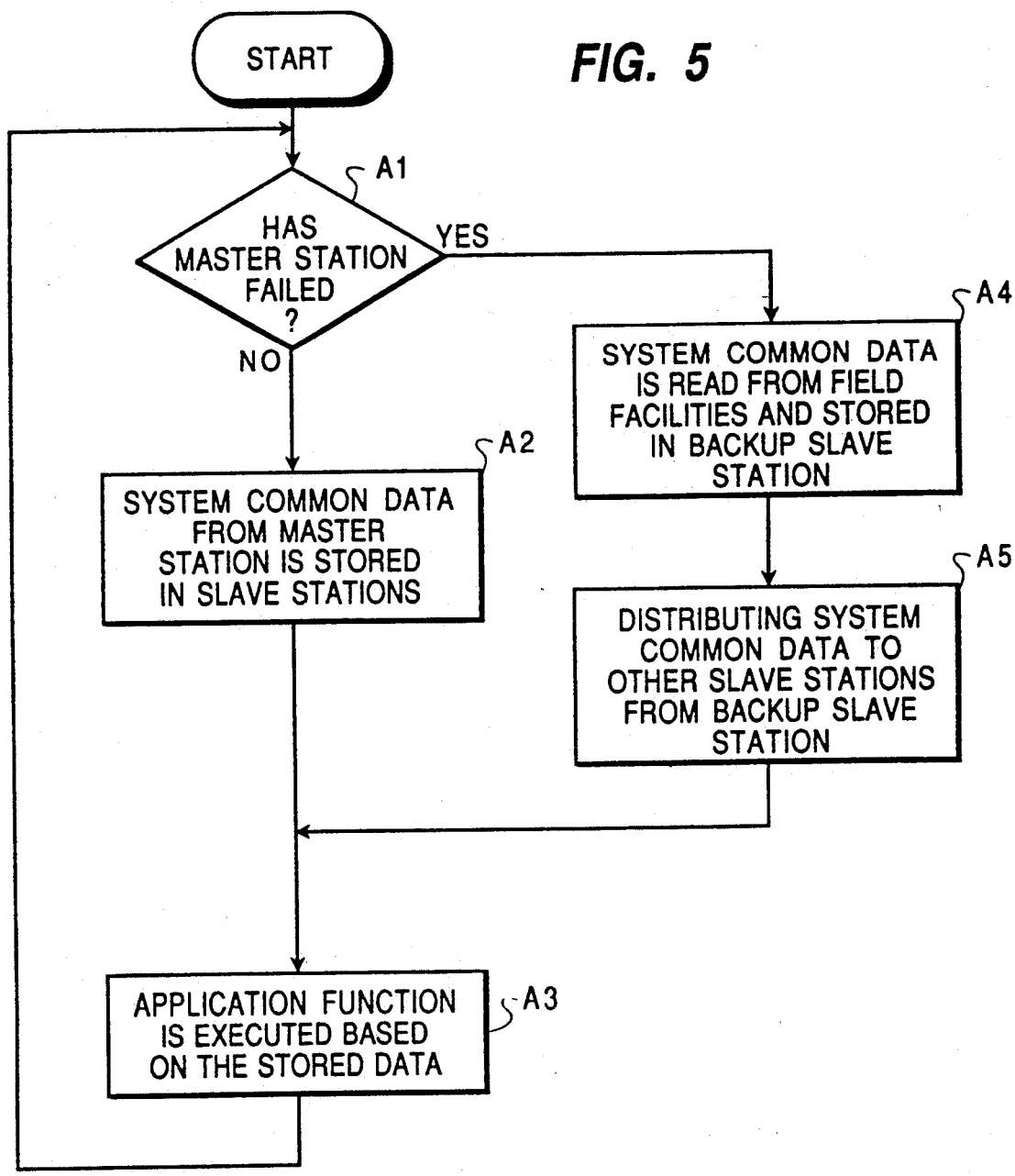
FIG. 5 is an operation flowchart of a particular slave station for backup of the present invention.

The processing the backup slave station 2-1 is shown in the flowchart of FIG. 5, while the processing of other slave stations 2-2, ..., 2-n in the flowchart of FIG. 6.

As shown in FIG. 5, the backup slave station 2-1 selects the NO route in step A1, when the master station 1 is operating normally. The system common data sent from the master station 1 is stored in the memory (RAM) 17 in step A2. In step A3, the application function is executed. However, if the master station 1 fails, the backup slave station 2-1 selects the YES route in A1. In step A4, the system common data is read from the field facility and stored in the memory (RAM) 17. In step A5, the system common data is distributed to the other slave stations in the same manner as the master station.

Thereafter, in step A3 the backup slave station 2-2 itself executes the application function based on the content being set.

If the master station 1 is operating normally as shown in FIG. 6, the other slave stations 2-2, ..., 2-n select the NO route in the step B1. Next, in step B2, the system common data sent from the master station 1 is stored in the memory (RAM) 18. In step B3, the application function is executed. However, if the master station 1 fails, the other slave stations select the YES route in the step B1. The system common data sent from the backup slave station is stored in 2-1 the memory (RAM) 18. Then, in step B3, the application function is executed based on the data stored in step B4.

As described above, the backup processing system of the present invention provides a particular slave station to backup the master station when it fails. Therefore, such a backup slave station safely and accurately executes the backup processing for controlling a process such as the schedule ON/OFF control in accordance with the conditions at that time. Thus the present invention improves redundancy of system and receives various parameters required for temperature and humidity control (DDC) even during the failure of the master station, providing an advantage that the energy saving characteristics can be improved.

What is claimed is:

1. A transmission system including a master station and a plurality of slave stations, for executing application processing in the slave stations on the basis of instructions provided by the master station and for receiving system common data, said system comprising:
   a particular slave station for backup operation of the master station when the master station fails and for normal operation under control of the master station as any of the slave stations;
   transmission means for supplying the system common data to the master station and to said particular slave station;
   automatic detection means for detecting failure of the master station; and
   backup execution means for polling the slave stations other than said particular slave station in place of the master station using the system common data.

2. A transmission system according to claim 1, wherein said particular slave station is one of the plurality of slave stations, and
   wherein the master station and said particular slave station store the system common data supplied by said transmission means.

3. A transmission system according to claim 1, wherein said transmission means supplies most important data as the system common data.

4. A transmission system according to claim 3, wherein the most important data is one of fire information and power supply ON/OFF information.

5. A transmission system according to claim 1, wherein the master station comprises
   a display unit for displaying facility information; and
   master execution means for periodically polling the plurality of slave stations to collect facility information stored in the slave stations.

6. A transmission system according to claim 1, wherein said transmission system further includes a communication line,
   wherein the master station and each of the slave stations, respectively, comprises a line interface unit, and
   wherein said line interface units are connected to each other with the communication line to realize transmission and reception of information through the communication line.

7. A transmission system according to claim 6, wherein the system common data is supplied by common facilities,
   wherein said transmission system further comprises a display unit, operatively connected to the master station, for displaying conditions of the slave stations,
   wherein the master station comprises:
      digital signal input/output means for receiving the system common data from the common facilities; and
      master control means for collecting and storing the system common data and for sending the system common data to each of the slave stations, wherein each of the slave stations comprises:
digital signal input/output means for controlling operations of air-conditioning and lighting facilities;
analog input/output means for inputting conditions data; and
slave control means for collecting and storing the conditions data of the air-conditioning and lighting facilities and sending the conditions data to the master station during the polling there of, and wherein said particular slave station is one of the slave stations and further operates to collect external air temperature and humidity information from the analog input/output unit and to receive the system common data input to the master station.

8. A transmission system according to claim 7, wherein said digital signal input/output means of said particular slave station also receives information depending on seasons.

9. A transmission system according to claim 1, wherein the slave stations control devices, and
wherein the master station periodically sends the system common data to the slave stations, and the slave stations store the system common data and control the devices connected thereto based on the system common data.

10. A transmission system according to claim 9, wherein the master station inserts schedule control information for each of the slave stations into the system common data, and the slave stations control ON/OFF conditions of the devices in accordance with the schedule control information.

11. A transmission system according to claim 9, wherein said particular slave station simultaneously receives the system common data input to the master station, controls the devices connected thereto by receiving the system common data from the master station while the master station is in an operating condition, and controls the devices connected thereto using the system common data when the master station fails, and sends the system common data, in place of the master station, to the slave stations other than said particular slave station.

12. A transmission system according to claim 11, wherein the slave stations other than said particular slave station receive the system common data from said particular slave station when the master station fails.

13. A transmission system according to claim 1, wherein said particular slave station is the one of the slave stations located nearest to the master station.

14. A transmission system according to claim 1, wherein said particular slave station is one of the plurality of slave stations.

15. A transmission system according to claim 14, wherein said particular slave station comprises said automatic detection means and said backup execution means.

16. A transmission system, having a master station and a plurality of slave stations, for performing application processing in the slave stations on the basis of instructions provided by the master station and for receiving system common data, said system comprising:
a particular slave station, from one of the slave stations, for backup operation of the master station when the master station fails, comprising:
automatic detection means for detecting failure of the master station; and
backup execution means for polling the slave stations other than said particular slave station in place of the master station using the system common data; and
transmission means for supplying the system common data to the master station and to said particular slave station.

17. A method for backing-up a master station of a transmission system during a failure of the master station, the transmission system receives system common data and includes the master station and slave stations, said method comprising the steps of:
(a) supplying the system common data to the master station and a particular one of the slave stations;
(b) detecting the failure of the master station; and
(c) polling the slave stations with the particular one of the slave stations when said detecting in step (b) detects the failure of the master station.

* * * * *

UNITED STATES PATENT AND TRADEMARK OFFICE
CERTIFICATE OF CORRECTION

PATENT NO. : 5,021,938
DATED : June 4, 1991
INVENTOR(S) : Masahiro Hayakawa It is certified that error appears in the above-identified patent and that said Letters Patent is hereby corrected as shown below:

Col. 1, line 12-13, delete "application methods at the slave stations in accordance with";
line 53, delete "to execute".

Col. 2, line 32, delete "or a backup slave station 2-1";
line 33, after "2-1)" insert --or a backup slave station 2-1--.

Col. 3, line 11, "receiving/" s/b --input/--, "input" s/b --receiving--.

Col. 4, line 54, after "also" insert --receive--.

Col. 5, line 51, delete the paragraph indention, "2-2" s/b --2-1--.

Col. 7, line 11, "there of" s/b --thereof--.

Signed and Sealed this

Fifth Day of January, 1993

Attest:

DOUGLAS B. COMER

Attesting Officer

Acting Commissioner of Patents and Trademarks